Oct. 7, 1952 A. SOWDEN 2,612,848
CARGO BRACE AND THE LIKE
Filed April 5, 1951 2 SHEETS—SHEET 1
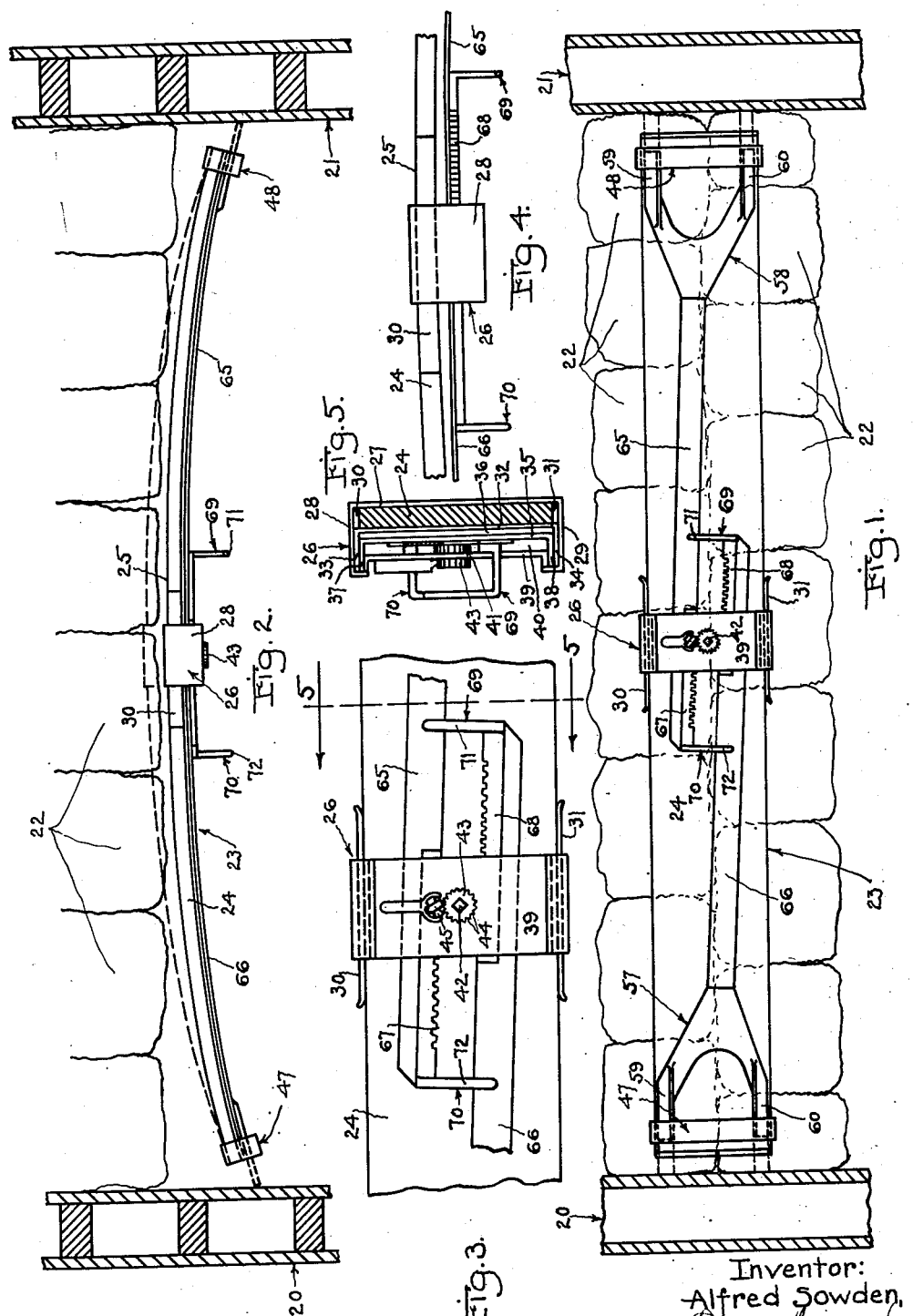
Inventor:
Alfred Sowden,
by [signature]
Atty.

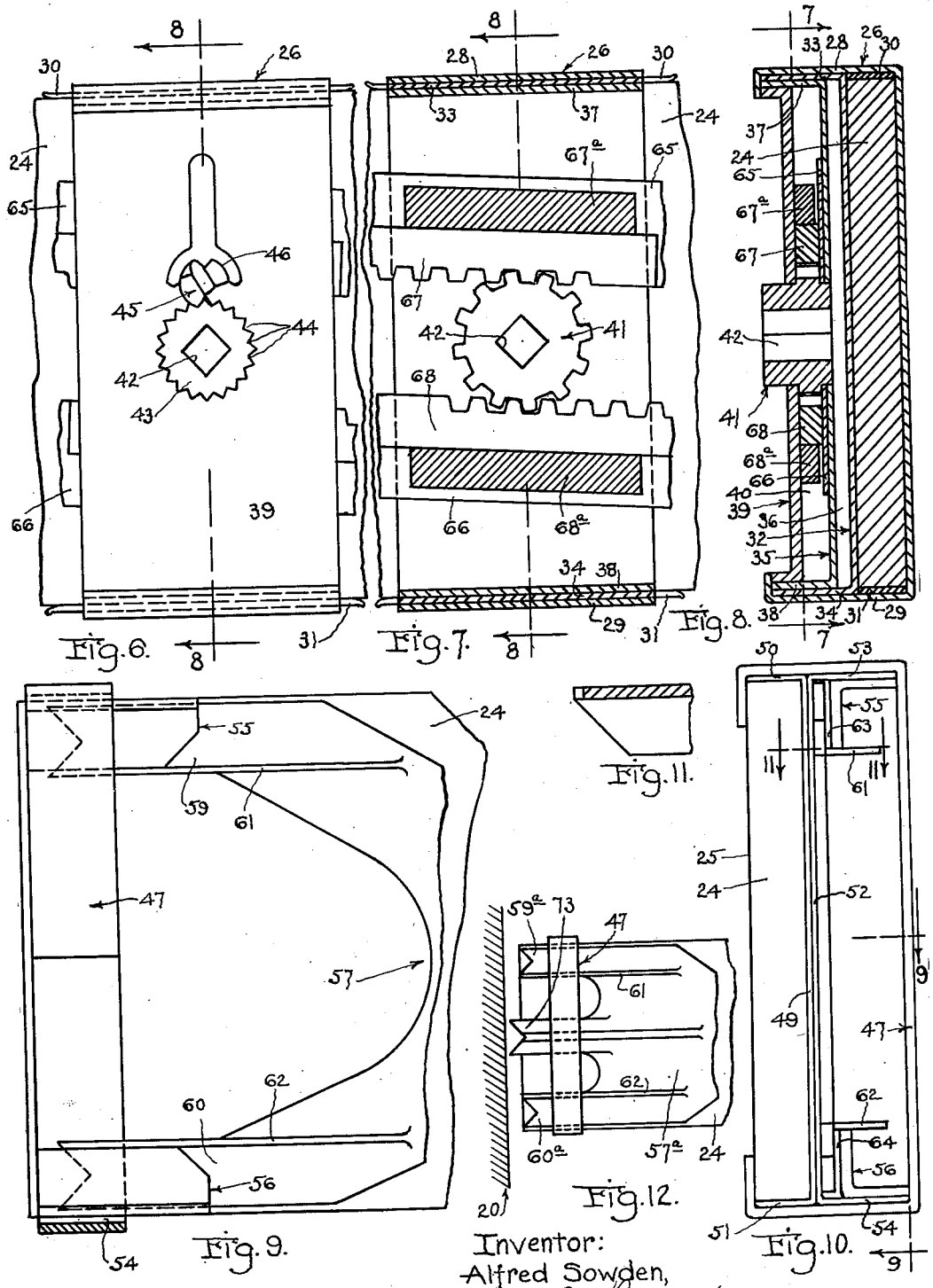

Patented Oct. 7, 1952

2,612,848

UNITED STATES PATENT OFFICE 2,612,848

CARGO BRACE AND THE LIKE

Alfred Sowden, Arkansas City, Kans.

Application April 5, 1951, Serial No. 219,406

20 Claims. (Cl. 105—369)

This invention has to do with improvements in cargo braces, and the like. Cargo braces are intended for use in the bracing of cargoes loaded for shipment and for similar uses. The cargo braces herein disclosed have been designed especially for temporary use in cars, trucks, and like carriers, during the loading of such carriers, and during preliminary movements of such carriers prior to commencement of the interstation movements of the carriers after loading.

In connection with the foregoing it will be understood that many cars, trucks, etc., are moved from one location to another during loading, taking on part of the load at one loading platform or point, and additional load at some other platform or point. During these localized movements the cars are subject to sudden starts and stops, jerks, and other impacts so that the already loaded freight is subject to such shocks prior to the time that the fully loaded cargo has been permanently locked or fastened in place in the car or truck. Such localized movements therefore subject the already loaded freight to shifting forces which are frequently as serious or even more serious than the forces to which such freight will afterward be subjected in actual shipment. Nevertheless it is not desirable or possible to permanently lock the cargo in place until all freight of the load has been placed in the car or truck.

The present invention concerns itself with a cargo brace which has been designed especially for use during the preliminary stages of the loading operation, to hold the already loaded freight in place during such stages of the loading operation, to prevent shift and disarrangement of the cargo already loaded, especially when the car or truck must be moved from one point to another during the loading operations and prior to completion of the full loading of the car. When such complete loading has been effected the braces embodying the presently disclosed features may be removed, and the load may be permanently secured in place for the actual shipping movements, or, if desired, the cargo braces herein disclosed may be left in place during shipment.

While the presently disclosed improvements are especially intended for use in temporary braces such as just referred to it will nevertheless be understood that said features might also be used in connection with braces intended for permanently locking the cargo in place during a complete shipping operation.

A principal feature and object of the present invention is the provision of a brace of such design and construction that it may be readily carried by a single workman to the location of installation, and may there be installed by him into locking position without the need of using special tools or implements. To this end the present brace is light, simple in design and construction, and readily manipulated during installation into place.

It is a further object of the invention to provide a design and construction of the brace such that when it has been properly placed in the car in position to retain the cargo for which it is intended, it may then be locked by a simple operation to cause it to exert a considerable pressure against the cargo, thus ensuring proper retention of such cargo in place as long as the brace remains in place. In connection with the foregoing it is intended to provide for exertion of such an amount of force or pressure against the cargo as will retain the already loaded freight against shift during the preliminary car movements to which reference has already been made herein. Thus, when using the brace in connection with the loading of sacked material such as flour, feed, etc., which freight is loaded by stacking the sacks in layers to the ceiling of the car, it is desirable to exert a substantial pressure against the piled up sacks at about the mid-height of the car body, so that shifting tendency during local movements will be prevented and overcome. The braces herein disclosed are capable of exerting a very considerable pressure against the already loaded freight in such cases as just deferred to as well as for many other uses.

It is a further feature and object of the invention to provide a cargo brace of such construction that it is adapted for use within cars or trucks of different widths, within a reasonable range of width variations. Generally freight cars and trucks are built to standard specifications of inside width and finish, but there are necessarily departures from such standard dimensions. Furthermore, the freight cars and trucks are built of several standard inside dimensions. It is intended that the braces herein disclosed shall be adjustable for use to different widths of car interior, within reasonable tolerances of such widths, so that a brace intended for use in a car or truck of specified width shall be usable in cars of that rated width and for such tolerances as may reasonably be expected to be found as between a large number of such cars or trucks.

In connection with the foregoing it is intended to provide a brace which is provided with a body portion of fixed size, combined with laterally extendable wall engaging elements which may be extended by the operator to engage the opposite walls under such amount of pressure as may be needed to ensure good holding of the brace against endwise shift thereof (lengthwise of the car or truck) under the shifting forces which may be expected to be developed during the local car movements. In this connection it is a further feature and object to provide these wall engaging elements with prongs or sharpened wall engaging portions capable of embedding themselves in the surfaces of the walls with such degree of force as may be needed to ensure good holding quality. Nevertheless it is intended that such engagements with the walls shall be readily disengaged when the brace is to be removed from its position in the car.

It is a further feature and object of the invention to so design and construct the brace that when it is extended and has its engaging end portions firmly engaged with the opposite walls further extending of the length of the brace, by further application of extending force by the operator, will cause the body portion of the brace to be distorted or bowed or bent outwardly way from the operator, and towards and into firm engagement with the freight, so that such extending force thus exerted by the operator will exert such freight holding force in whatever amount may be determined by the force applied by the operator to cause such extension of the length of the brace. In other words, when the extreme end portions of the brace have been brought into firm engagement with the opposite walls, further extension of the length of the brace will cause a bending or increased bowing of the body portion of the brace to occur, with corresponding exertion of endwise force against the body of freight to which the brace is applied. The amount of such endwise exerted force will depend on the amount of extending force which is developed by the operator. Since the extending force developed by the operator is that force which also develops the force exerted against the body of loaded freight it is evident that the force developed to engage the walls of the car is also proportional to the endwise force being developed against the loaded freight, so that the force developed against the loaded freight is resisted by a proportionately large holding force developed against the car walls.

Specifically, it is an object of the invention to provide a brace including a curved or bow-shaped body element which is bendable or yieldable for increase of its bowed deflection by application of end force to its ends, together with extendable wall engaging end elements or portions which are so designed as to ensure good engagement with the inside wall surfaces; and means to force these end elements or portions to be extended when the brace has been set into place with said end portions in engagement with or properly held to engage the wall surfaces during such extension operation. Since the walls themselves are substantially unyielding and will resist spreading force of large amount, the extending forces thus exerted against the walls are converted into forces of distortion or increased bowing of the body portion of the brace, causing such body portion to be further bowed or bent, and thus exerting endwise movement and pressure against the face of the cargo which is to be locked and held in place. The amount of such pressure may thus be increased by increase of the endwise extending force exerted by the operator during the installation of the brace into place.

In connection with the foregoing it is a further object to provide such bendable bowed body portion of the brace of a material or materials which shall normally tend to return or bias to their original form, being of a small amount of bend or bow, being normally biased to such relatively small amount of bend or bow. Such returning movement will of itself tend to relieve the force against the cargo, and thus will relieve the force with which the end portions of the brace engage the car walls. This will facilitate removal of the brace from its cargo retaining position. Furthermore, when thus returned to its normally biased form the brace is again ready for a new installation to retain another body of cargo during another loading operation.

In connection with the foregoing it is intended that such body portion of the brace may be made of any suitable material, such as metal, wood, or plastic, or ply-wood or other pre-formed woody or cellulose material. However, it is noted that since this body portion should be pre-formed to have the intended amount of bow, the use of such materials as plastic, pre-formed woody and ply materials, is desirable. Furthermore, such materials are of light weight but high compression or crushing strength so that the completed brace formed from such body materials is desirable.

It is a further feature and object of the invention to make provision for ready and simple development of the desired expanding force to the end portions of the brace. In this connection I have provided a simple form of construction in which the necessary expanding forces may be initially developed by straight endwise movements of the two hands of the operator to set the brace into position against the cargo and between the car walls; followed by a powerful expanding force developed by a simple rotary movement exerted by a readily removable crank or like tool. Suitable locking means are provided to retain the parts in their thus expanded condition as long as the brace is to retain its holding function; and which locking devices may be readily unlocked and removed when the brace is to be removed.

Other objects and uses are to provide a very simple form of construction, one which can be readily made at low cost, one which shall not be subject to deterioration at excessive rate during normal service, and otherwise to provide an improved device for this and like purposes.

Other objects and uses of the invention will appear from a detailed description of the same, which consists in the features of construction, and combinations of parts hereinafter described and claimed.

In the drawings:

Figure 1 shows a face view of a brace embodying the features of the present invention, set into place between the side walls of a car or truck, and locked in such position (as shown by the dotted lines), the brace illustrated being used for holding a stack of sacks of freight by way of illustration;

Figure 2 shows a plan section corresponding to Figure 1, and this figure shows by full lines the normal or biased form of the body of the brace (being its normal or slightly bowed condition) and this figure also shows by dotted lines the projected end elements, and the more bowed condition produced in the body portion of the brace by the end forces developed by engagement of such end elements with the car walls;

Figure 3 shows, on enlarged scale as compared to Figures 1 and 2, and in fragmentary form, the central portion of the brace, and it shows the two endwise movable bars and the racks which are secured to them, and it also shows the central operating rotatable element and the dog for retaining the same in its operated position to retain the brace in its position;

Fig. 4 shows a fragmentary plan view corresponding to Figure 3, and it shows more clearly the hand grips by which the cargo brace may be carried and may be held in correct position and by which the two endwise movable elements may be extended from each other during the preliminary application of the brace to the load, to be followed by development of a much larger locking and load holding force by the use of the crank applied to the pinion element;

Figure 5 shows a cross-section taken on the line 5—5 of Figure 3, looking in the direction of the arrows; and it shows the bendable or bowed body element in section;

Figure 6 shows on still larger scale the central portion of the brace, in front elevation;

Figure 7 shows a view similar to that of Figure 6, but with the front plate or bracket cut away to show the pinion and the engaging portions of the two racks, and may be considered a section taken on the line 7—7 of Figure 8, looking in the direction of the arrows;

Figure 8 shows a cross-section taken on the lines 8—8 of Figures 6 and 7, looking in the directions of the arrows;

Figure 9 shows an enlarged scale fragmentary face view of the left-hand end portion of the bowed element, and the left-hand wall engaging element and related parts, the prongs being withdrawn into their normal or non-engaged position; and Figure 9 may be considered as a half section taken on the line 9—9 of Figure 10, looking in the direction of the arrows (that is, horizontally) showing the upper half of Figure 9 in elevation, and the lower half thereof in section, divided at the central section line of Figure 10;

Figure 10 shows an end view looking at the element of Figure 9;

Figure 11 shows a fragmentary horizontal section taken on the line 11—11 of Figure 10, looking in the direction of the arrows; and Figure 12 shows on smaller scale a face view of the left-hand end portion of the device of modified form in which there are provided three prongs for engagement with the wall surface, the central prong being of greater length than the upper and lower prongs so as to ensure good engagement with the wall surface irrespective of slight non-horizontality of the device across the width of the car.

In Figures 1 and 2 I have shown my improved cargo brace as applied in place to retain a cargo of sacks against endwise shift. The side walls of the car or truck are shown at 20 and 21, and the sacks are shown at 22, being indicated in Figure 1 in the two superimposed layers which break joints. I shall refer to this fact presently. The cargo brace of the present invention is indicated generally by the numeral 23. In Figures 1 and 2 this cargo brace is shown in its normal or slightly bowed or biased form by full lines, and in its more bent or bowed or working form by the dotted lines.

The cargo brace includes a body element 24, normally bowed into the general form shown in Figure 2 wherein it is shown as being bowed and set with its convex face 25 against the cargo material to be retained in place. This body element may be made of any suitable bendable material, of sufficient elasticity to naturally return to its intended normally biased condition of least amount of bow, of the general form shown in Figure 2, by the full lines. Means are provided, in conjunction with this body element, for locking its end portions against endwise movement of the car or truck body, and to enable said end portions to resist endwise movement along the walls under such shocks and other forces as may be developed during the time that the brace is in working position. This bendable body element 24 is preferably of such width as to present the desired amount of pressure surface to the cargo, and to provide the desired cross-section of such body element consistent with a proper thickness thereof. In the case of such materials as a fiber-glass, or ply-wood, such general proportions as indicated in Figure 5 will be found satisfactory.

A fixture generally shown at 26, is carried by and connected to the central portion of this body element 24. This fixture 26 includes the means whereby suitable endwise movable wall engaging elements are manually actuated to establish the desired engaging forces with the walls, and to thus exert the desired bow increasing action on the body element to develop the holding force of said element against the cargo. Conveniently this fixture 26 includes a channel or looped shaped section 27 extending vertically over the back face of the element 24, and having its upper and lower flanges 28 and 29 reaching forwardly over the edges of the element 24 far enough to support or be connected to other elements of said fixture. The width of this fixture (lengthwise of the element 24) need not be very great as compared to its height, as shown in Figures 1, 3, 6 and 7, to accommodate other elements carried by said fixture; and therefore, to provide additional bearing surface along the upper and lower edges of the element 24 I have shown the two shoes 30 and 31 set between the upper and lower flanges 28 and 29 and the edges of the element 24. These shoes may be of sheet metal, and they extend outwardly far enough to provide such lengths of bearing against the lower and upper edges of the element 24 as will avoid the development of excessive forces against said edges of said element during the application of rotative force to the pinion, presently to be described, during the initial application of the brace to the walls. These shoes may be secured to the flanges 28 and 29 by riveting or spot welding or otherwise as desired. These shoes will thus prevent development of excessive forces tending to cause the edges of the flanges 28 and 29 to "dig into" the edges of the element 24.

A channel element 32 is set between the flanges 28 and 29 of the element 27, and pressed against the front face of the element 24 so as to lock the fixture 26 in place on said element 24. Conveniently the upper and lower flanges 33 and 34 of this element 32 are set directly between the forwardly extending flanges 28 and 29. Another channel shaped element 35 is set into place between the forwardly extending flanges 33 and 34 of the element 32, this element 35 being set forwardly with respect to the element 32 far enough to provide a slight clearance or space 36 between the webs of the two elements 32 and 35 as is well shown in Figures 5 and 8. The purpose of this clearance will appear hereinafter. The flanges 37 and 38 of this element 35 are set against the flanges 33 and 34 of the element 32.

In advance of the channel shaped element 35 there is shown still another or front element 39 which is set between the upper and lower flanges 37 and 38. This front element is spaced forwardly of the element 35 far enough to provide the space 40. A pinion 41 has its front and rear ends journalled in this element 39 and in the element 35, respectively, and this pinion is provided with the non-circular central through opening 42 into which may be set the shank of an operating crank (not shown) to be operated by the operator for rotating the pinion for extending the end portions into locking engagement with the car walls, as presently to be shown. The outer or front end of this pinion element carries a pinion 43 (see Figures 1, 3 and 6) provided with the teeth 44 which may be engaged by a dog 45 for locking the pinion at its rotated position, while permitting further rotation in the same direction. This dog 45 is rockingly mounted in a circular recess 46 carried by the front element 39, and it may be turned into either of two positions, to thus allow the pinion to be rotated in either direction, but with locking against reverse movement in either case. Thus the pinion may be rotated by the inserted crank to produce the endwise movement presently to be described, and said pinion will be retained in whatever position of rotation it has thus attained. When it is desired to release the engagement of the end elements from the car walls such release may be effected by slightly rotating the pinion in the same direction as that in which it was rotated during the locking of the brace to the car walls, to thus effect dog release; after which the dog may be turned over to allow the pinion to freely run its complete amount needed to completely release the brace from the car walls and allow of removal of the brace from such walls. This type of retaining dog is well known in the mechanical arts, and as an example I may refer to such constructions thereof as are produced by the Owatonna Tool Company of Owatonna, Minnesota, but I do not intend to limit myself to this or any other form of retaining and reversible dog.

Conveniently the extreme front edges of the flanges 28 and 29 of the channel element 27 are bent over the front edges of the flanges of the elements 32, 35 and 39 as well shown in Figure 8. If desired suitable rivets or screws may also be extended through said flanges to retain the elements of the fixture 26 firmly together.

The body element 24 is made slightly shorter than the interior width of the car or truck wherein the brace is to be used, so that when said brace is set between the walls its ends will not directly engage such walls. To each end of this body element there is secured a loop-shaped element, being the two elements 47 and 48. The left-hand element is shown in detail in Figures 9 and 10. The construction of the element 47 will be described in detail, and this description will also be typical of the element 48.

A channel section 49 is set onto the end portion of the body element 24 and has its upper and lower flanges 50 and 51 set onto the upper and lower edges of the element 24. Another channel section 52 is set back to back against the channel section 49, so that its upper and lower flanges 53 and 54 reach forwardly as shown in Figure 10. Thus there is defined a rectangular opening between the elements 52 and 47 and in advance of the front face of the end portion of the body element 24. The short angle-bar elements 55 and 56 are secured against the inwardly facing surfaces of the flanges 53 and 54, but are set forwardly of the vertical web of the channel element 52 to provide spaces between the said channel web and the vertical arms of the angle elements 55 and 56 for accommodation of the endwise movable car wall engaging prong elements presently to be described. Said prong elements are allowed to move endwise with respect to the element 47 (and the corresponding element 48) as will soon be evident.

These are the prong elements 57 and 58 for the two ends of the brace. Of these I shall describe only the element 57 as such description will also be typical of the element 48. The element 57 is of generally bifurcated form, including the upper and lower prongs 59 and 60. This element 57 may be formed of sheet steel of suitable gauge to give the desired stiffness, or it may be cast, forged, or otherwise formed. The extreme ends of these prongs 59 and 60 are preferably sharpened, as by cutting them on angles as shown, so that said prongs present sharp points for engagement with the car walls. Thus, by pressing the elements 57 and 58 strongly towards the walls these sharp prongs will be forced slightly into the walls, thus producing the desired degree of engagement to prevent endwise slip or movement of the brace ends along the wall surfaces. Preferably the flat sections 61 and 62 are secured to the front faces of the prongs 59 and 60, as by welding, said flats projecting forwardly just beneath and above the edges of the angle sections 55 and 56, so as to guide the bifurcated prong element during its reciprocations as will be evident from examination of Figures 9 and 10. Such reciprocations are of amount in outward or wall engaging direction sufficient to ensure good holding against the car walls, but when drawn inwardly or retracted these prongs do not disengage from the elements 47, but withdraw into said elements as shown by the dotted line in Figure 9. Examination of Figure 10 will show that the clearances between the web of the channel element 52 and the vertical arms of the angle elements 55 and 56 are slightly greater than the thicknesses of the prongs, so that a suitable freedom of movement of the prongs is assured at all times without binding. Such clearances are shown at 63 and 64 in Figure 10.

Means are provided connecting these bifurcated prong elements with the pinion element 41 so that the pinion rotations are communicated to the prong elements as reciprocations, and so that when the pinion is locked against rotation by the dog the prongs are retained securely in engagement with the car walls. Such means includes longitudinally extending connecting members reaching along in front of the front concave face of the bowed body member 24, and preferably slightly spaced therefrom. These members are also slightly flexible so that the proper connections will be maintained between the prong elements and the connections to the pinion, notwithstanding the slight change in the amount of bowing of the body member 24 in either direction, and to which I have already referred. To effect the desired connections I have provided the sheet metal compression elements 65 and 66 whose outer ends are connected to the yokes of the bifurcated prong elements in suitable manner, as by welding or otherwise. These elements are formed of sheet metal, preferably steel, of such thickness that the needed amount of compression force may be transmitted through them from locations close to the fixture 26 at the center of the brace, to the ends where the prongs are located, but still these sheet metal elements are not so stiff as to prevent such amounts of flexing (if any) as may be necessary during the setting of the brace into and locking it in working position, and afterwards during removal of the brace from its working position. The following further comments are also noted in this connection:

When the brace is first set into location and with its ends close to the two walls, its body member 24 is biased back to its normal and slightly bowed condition, such as shown by the full lines in Figure 2. Under these conditions the prongs are not yet in engagement with the wall surfaces. Then, as the pinion is rotated the prongs will be projected (as will presently be shown) until their sharpened ends come into engagement with the wall surfaces. Thereafter further rotation of the pinion under force and against resistance, due to the engagement of the prongs with the wall surfaces, the effect will be an elongation of the distance between the two prong elements. Such elongation can only be accommodated by a further flexing or bowing of the body element 24, with corresponding extension of the prong elements beyond the fixtures 47 and 48, said fixtures retreating slightly from the wall surfaces with which the prongs are engaged as will be readily apparent from Figure 2. Such further flexing or bowing of the body member 24 will result in its being forced away from the observer and against the face of the cargo material, and into such a form as shown by the dotted lines in Figure 2. This will also ensure good and firm pressure against the exposed face of the loaded cargo, and will ensure good holding of the cargo in place during the time the brace remains in its position. It is here noted that this flexing tendency thus developed is due directly to the fact that the compression members which exert their forces against the prong members are located in advance of the body element 24, and not behind it. When the dog is thereafter released to allow the pinion to rotate reversely, to permit the prong members to withdraw from the walls, the biasing of the body member 24 will cause said member to return to its less flexed or bowed condition, thus again drawing the prong elements into the fixtures 47 and 48, and releasing them from the car walls.

The elements 65 and 66 enter the space 40 of the fixture 26, and lie against the web of the channel element 35 (see Figure 8). The rack bars 67 and 68 are secured to the front faces of the proximate ends of these elements 65 and 66, preferably by welding or the like, and thus occupy positions also within the space 40 of the fixture 26. These rack bars have their teeth facing downwardly and upwardly, respectively, and meshing with the opposite sides of the pinion, so that rotation of the pinion serves to project both rack bars outwardly, or release of the dog permits inward movement of both rack bars simultaneously. In both cases both of the prong elements are simultaneously operated and controlled. The guide bars 67ª and 68ª may be secured to the inner face of the element 39 of the fixture 26 to engage the upper and lower edges of the rack bars and thus retain said rack bars in good meshing engagement with the pinion at all times.

Preferably the handles 69 and 70 are provided in connection with the two rack bars or the two compression transmitting elements, to facilitate setting and locking the brace into its working position. Each of these handles extends forwardly a short distance, and then vertically so as to provide the hand grip portions, 71 and 72, respectively. It will be seen from Figure 1 that these two hand grips overlap, that is, they are in substantial horizontal alignment, but separated from each other some distance horizontally, the amount of such separation depending on the rotated condition of the pinion, and the amount of projection of the prong elements or members. When the pinion is in its normal position these handles are farthest apart, as shown in Figures 1 and 2, and as the handles are drawn towards each other the prong members are projected into engagement with the opposite car walls. By this operation the brace may be set into place and retained in such location with some degree of force, by this manual direct separation of the prongs; and then the crank may be applied to the pinion and a much greater force may be developed to cause good engagement of the sharpened prongs with the wall surfaces, even to the extent of slight penetration of the wall surfaces if needed. It is here noted that by the use of this handle arrangement the left handle 70 may be gripped by the right hand, and the right handle 69 may be gripped by the left hand, so that by then drawing both hands towards each other, a normal hand movement, both of the handles 70 and 69 will also be drawn towards each other with corresponding projection of the two prong members 57 and 58 outwardly and into engagement with the car walls. Furthermore, this handle arrangement provides a very convenient means for the operator to pick up the brace by use of both hands and set it into correct positioning, and then ensure the engagement of the prongs with the walls with sufficient force and retaining engagement to hold the brace in such position until the crank may be applied to the pinion and used for generation of the large force ultimately desired.

It is now noted that when the prongs have been projected under force and are being retained in their projected condition there are developed turning moments or torques which are transmitted to the fixture 26 and develop a tendency for that fixture to rock on the element 24. Since the forces thus developed must be communicated through the relatively narrow edge of this member 24 it is desirable to make provision for distributing said forces over an enlarged area. To this end I have shown the shoes 30 and 31 which reach outwardly over a substantial length of the edge of the element 24 to ensure such distribution of forces as will prevent damage to the edges of the element 24.

I have previously mentioned that the compression members 65 and 66 are spaced slightly in front of the body member 24 so as to provide a space between these parts. Thus space or clearance will ensure that during the movements of the parts incident to setting the brace into position and removing it, there will not be sliding contacts between the elements 65 and 66 and the front face of the body member 24. It is also noted that at various locations I have provided slight clearances or spaces between moving parts, so that there will not be any binding or other improper interference with various relative movement which must be executed between the various parts during the operations.

Examination of Figure 1 shows how, by reason of the considerable vertical dimension or width of the body element 24 the brace may be so set into place across the car that said body element will span two successive layers of the stacked cargo, thus ensuring a better hold on the entire body of cargo than when only a single layer is directly engaged. Such loading may be defined as "breaking joint" loading of such material as sacked and similar cargo.

It will be also be seen that my improvements are such that the brace will accommodate itself with equal facility and holding power when installed into cars of various widths within the expanding capacity of the end elements 57 and 58, since, when said elements have once been brought into engagement with the surfaces of the walls the desired magnitude of engaging force may be developed by a rather limited further amount of expanding movement of said elements away from the ends of the body element 24. In other words, when contact has once been effected between the pointed ends of said elements 57 and 58 with the wall surfaces, further rotation of the pinion will cause the engagements with the wall surfaces to increase, and such additional amount of movement may be rather small to ensure the desired amount of wall engaging pressure to be developed.

In Figure 12 I have shown, on smaller scale than that of Figures 6 to 11, a face view of the left-hand end portion of the bowed element and the wall engaging prong element at the same end. In this case I have shown the element 57ª as being provided with the upper and lower prongs 59ª and 60ª, and with the third or central prong 73. This central prong is shown as being of greater projection than the upper and lower prongs, so that it will engage the wall surface prior to engagement of the upper and lower prongs with such wall surface when the device is set between the car walls perfectly normal to such walls. However, in case of slight departure of the device from such condition of normality with the car walls, it will be evident that one or the other of the upper and lower prongs will engage the wall surface earlier than the other one of such prongs, the central prong being in wall engagement in any case. That is, when the device is set between the car walls it is not necessary for the user to exercise great care to ensure that the device is normal to the walls, since the central prong and one of the upper and/or lower prongs will come into engagement with the wall surface to ensure good gripping action at two points which are displaced vertically one above the other; and in case the device is forced strongly against the wall sufficient penetration of the so-engaged prongs into the wall material will occur to also allow the third prong to come into penetrating engagement with the wall material. Due to the fact that this three prong arrangement provides prongs which are only one-half as far apart as the two prong arrangement of Figures 6 to 11 it follows that in order to cause engagement of two prongs with the wall surface it is only necessary to force the prong which is first to meet the wall surface into such surface one-half as far, to bring the second prong into wall engagement as would have been the case with the two prong arrangement; it being assumed that the upper and lower prongs are as far apart in the three prong arrangement as in the two prong arrangement.

The details of construction of this modified form of Figure 12 may be similar to those of the construction shown in Figures 6 to 11, so it is not deemed necessary to describe such details of construction herein.

I claim:

1. A cargo brace for use in a vehicle to extend between the opposite walls of said vehicle, said brace comprising in combination a bowed elastically flexible body member having a chord length not greater than the distance between said walls, a wall engaging element movably connected to each end portion of said bowed body member and movable endwise of said body member towards and away from the adjacent wall surface, common means carried by the body member for actuating said wall engaging elements, connections between said common actuating means and said wall engaging elements for simultaneous projection of said wall engaging elements endwise beyond the ends of the body member into engagement with the proximate wall surfaces, and means to releasably lock said common actuating means in its actuated position to retain the wall engaging elements in projected wall engaging condition.

2. Means as specified in claim 1 wherein said common actuating means and said connections are located at the concave side of said bowed body member to thereby exert a bending moment on said body member when said wall engaging elements are in engagement with the walls and said common actuating means is actuated, said bending moment tending to increase the amount of bend of said bowed body member.

3. Means as specified in claim 2 wherein the convex surface of said bowed body member faces against a cargo load carried by said vehicle.

4. Means as specified in claim 1 wherein said bowed body member comprises a length of flexible material of elastic nature formed with a normal degree of bow curvature and normally biased to such bow curvature, whereby when said common actuating means is released said wall engaging elements may retract inwardly with the respect to the end portions of the body member, with simultaneous elastic movement of the bowed body member towards its biased form and with reduction of its bow curvature.

5. Means as specified in claim 4 wherein said bowed body member is of substantially greater vertical dimension than its thickness.

6. Means as specified in claim 5 wherein said bowed body member comprises a length of plywood.

7. Means as specified in claim 5 wherein said bowed body member comprises a length of elastic plastic material.

8. Means as specified in claim 5 wherein said bowed body member comprises a length of fiberglass.

9. A cargo brace for use in a vehicle to extend between the opposite walls of said vehicle, said brace comprising in combination a bowed elastically flexible body member having a chord length not greater than the distance between said walls, a wall engaging element movably connected to each end portion of said bowed body member and movable endwise of said body member towards and away from the adjacent wall surface, each of said wall engaging elements including a sharp wall engaging prong, common means carried by the body member for actuating said wall engaging elements, connections between said common actuating means and said wall engaging elements for simultaneous projection of said wall engaging elements endwise beyond the ends of the body member into engagement with the proximate wall surfaces, and means to releasably lock said common actuating means in its actuated position to retain the wall engaging elements in projected wall engaging condition.

10. A cargo brace for use in a vehicle to extend between the opposite walls of said vehicle, said brace comprising in combination a bowed elastically flexible body member having a chord length not greater than the distance between said walls, a wall engaging element movably connected to each end portion of said bowed body member and movable endwise of said body member towards and away from the adjacent wall surface, each wall engaging element including a bifurcated member provided with upper and lower wall engaging prongs, the prongs of each bifurcated member lying in a plane substantially tangent to the bowed curvature of the proximate end portion of the body member, common means carried by the body member for actuating said wall engaging elements, connections between said common actuating means and said wall engaging elements for simultaneous projection of said wall engaging elements endwise beyond the ends of the body member into engagement with the proximate wall surfaces, and means to releasably lock said common actuating means in its actuated position to retain the wall engaging elements in projected wall engaging condition.

11. A cargo brace for use in a vehicle to extend between the opposite walls of said vehicle, said brace comprising in combination a bowed elastically flexible body member having a chord length not greater than the distance between said walls, a wall engaging element connected to said bowed body member and adjacent to each end of said bowed body member, and movable with respect to said body member end towards and from the proximate wall surface, common means carried by the body member for actuating said wall engaging elements, and connections between said common actuating means and said wall engaging elements.

12. Means as specified in claim 11 wherein each of said wall engaging elements is slidable with respect to the proximate end portion of the bowed body member, and wherein said connections between said common actuating means and said wall engaging elements comprise reciprocable elements extending between the common actuating means and the wall engaging elements.

13. Means as specified in claim 12 wherein said common actuating means comprises a pinion carried by the central portion of the bowed body member, and whereby each of the said connections includes a rack element meshing with such pinion.

14. Means as specified in claim 12, together with a handle element connected to each of said reciprocable elements for support of the cargo brace prior to engagement of the wall engaging elements with the proximate wall surfaces, and for manual movement of the wall engaging elements outwardly into wall engaging positions.

15. Means as specified in claim 14, wherein said handle elements for the two reciprocable elements are relatively positioned at opposite sides of the common actuating means and are respectively connected to wall engaging elements located at the opposite ends of the bowed body member from the sides of the common actuating means at which such handle elements are located.

16. A cargo brace for use in a vehicle to extend between the opposite walls of said vehicle, said brace comprising in combination a bowed elastically flexible body member having a chord length not greater than the distance between said walls, a wall engaging element connected to said bowed body member and adjacent to each end of said bowed body member, and movable with respect to said body member end towards and from the proximate wall surface, common means carried by the body member for actuating said wall engaging elements, and connections between said common actuating means and said wall engaging elements, each of said wall engaging elements being slidable with respect to the proximate end portion of the bowed body member, the connections between said common actuating means and said wall engaging elements comprising reciprocable elements located at the concave side of the bowed body member and extending between the common actuating means and the wall engaging elements.

17. A cargo brace for use in a vehicle to extend between the opposite walls of said vehicle, said brace comprising in combination a bowed elastically flexible body member having a chord length not greater than the distance between said walls, a wall engaging element movably connected to each end portion of said bowed body member and movable endwise of said body member towards and away from the adjacent wall surface, common means carried by the body member for actuating said wall engaging elements, connections between said common actuating means and said wall engaging elements for simultaneous projection of said wall engaging elements endwise beyond the ends of the body member into engagement with the proximate wall surfaces, and means to releasably lock said common actuating means in its actuated position to retain the wall engaging elements in projected wall engaging condition, each of said wall engaging elements including three wall engaging prongs lying substantially in a plane tangent to the bowed curvature of the proximate end portion of the body member, one of the prongs of each wall engaging element being longer than the other prongs of such wall engaging element.

18. Means as specified in claim 17 wherein the longer prong of each wall engaging element is located between the other prongs of such wall engaging element.

19. A cargo brace for use in a vehicle to extend between the opposite walls of said vehicle, said brace comprising in combination a bowed elastically flexible body member having a chord length not greater than the distance between said walls, a wall engaging element connected to said bowed body member and adjacent to each end of said bowed body member, and movable with respect to said body member end towards and from the proximate wall surface, common means carried by the body member for actuating said wall engaging elements, and connections between said common actuating means and said wall engaging elements, each of said wall engaging elements including three wall engaging prongs lying substantially within a plane normal to the plane within which the elastically flexible body member is bowed, one of the prongs of each wall engaging element being longer than the other prongs of such wall engaging element.

20. Means as specified in claim 19 wherein the longer prong of each wall engaging element is located between the other prongs of such wall engaging element.

ALFRED SOWDEN.

No references cited.